April 30, 1968 W. SCHAFFLER 3,380,321
BORING BAR
Filed March 2, 1966
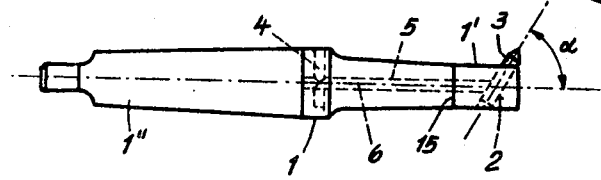
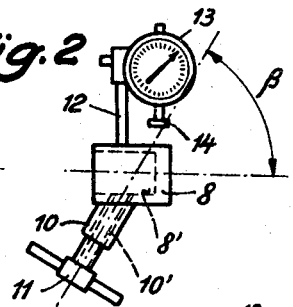
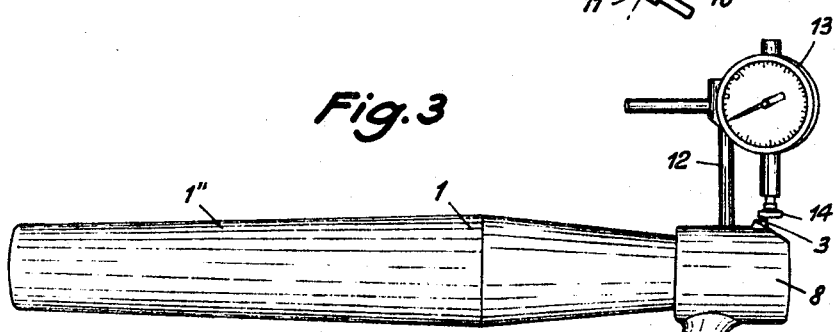
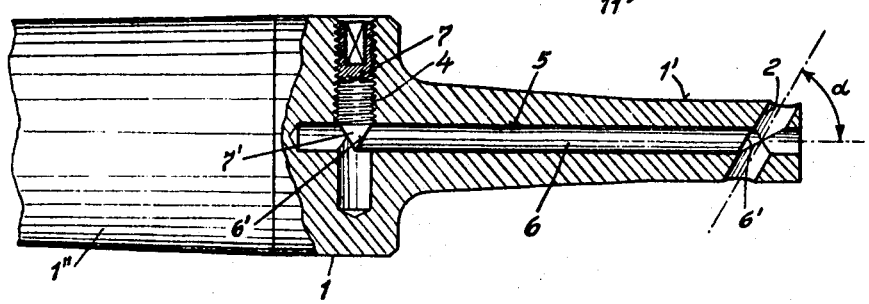
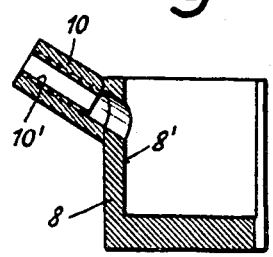
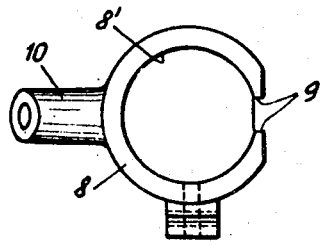
INVENTOR:
Willi Schäffler
BY
Karl J. Ross
Attorney 3,380,321
BORING BAR
Willi Schäffler, 49 Ulmenweg, 8400 Winterthur,
Switzerland
Filed Mar. 2, 1966, Ser. No. 531,114
Claims priority, application Switzerland, Mar. 9, 1965,
3,363/65
6 Claims. (Cl. 77—58)

ABSTRACT OF THE DISCLOSURE

A boring bar having an elongated body with a boring head at one end thereof provided with a bore inclined to the axis of the boring-bar body and slidably receiving a boring tool which is clamped by an axially extending push rod whose beveled face bears against the tool and which is biased axially by a set screw threaded into the body at the other end of the axial bore so that the conical tip of the screw cams another beveled face of the push rod in the direction of the boring tool; a measuring device is provided for ascertaining and setting the extent of projection of the tool and includes a sleeve adapted to fit over the head of the boring bar and having a slot into which the tool projects. A screw aligned with the tool-receiving bore is provided in the sleeve for advance of the tool which co-operates with a feeler on the sleeve of an indicator dial.

---

This invention relates to a bar for drilling and boring holes, having a boring tool which is adjustably supported in a transverse bore of the boring-bar head, the latter serving as bed and guide.

From conventional drilling or boring bars, the bar according to the invention differs in that provision is made for means adapted to clamp the boring tool frictionally in its bed, and that the boring bar has allocated to it a measuring device with a slotted sleeve capable of being pushed onto the boring-bar head for the passage of the boring tool, in which sleeve there is adjustably mounted a set screw whose inclination with respect to the sleeve axis corresponds to the inclination of the tool bed to the boring bar axis, while on the side of the sleeve opposite the set screw, the measuring device is arranged with a measuring feeler radially adjustable relative to the sleeve axis, for setting and measuring the projection of the boring tool.

The bar according to the invention enables a quick, easy and accurate setting of the desired projection of the boring tool.

The accompanying drawing shows by way of example one preferred embodiment incorporating the invention.

FIG. 1 is a side view of the boring bar with the boring tool;

FIG. 2 is an elevational view of the measuring device allocated to the boring bar for setting and determining the projection of the boring tool;

FIG. 3 is an enlarged side view which shows the boring bar with the measuring device pushed onto the boring-bar head;

FIG. 4 is a side view, partly broken away, showing the head of the boring bar on an enlarged scale, partly in axial section;

FIG. 5 is a detail view of the measuring device in axial section; and

FIG. 6 is a top view of the device of FIG. 5.

Referring to the drawing, numeral 1 designates a boring bar with the cylindrical boring-bar head 1' and the fixing cone 1". In the cylindrical boring-bar head 1' there is a transverse bore 2 which includes with the boring-bar axis an acute angle α open to the front or forward end of the bar, and which serves as bed and guide for a displaceable boring tool 3 (hereinafter merely referred to as the tool).

Towards the fixing shaft 1", the boring bar is provided with another transverse bore 4 which, through an axial bore 5 of the boring bar, is connected to the transverse bore 2 holding the tool 3. Between the two transverse bores 2 and 4, the axial bore 5 has a pushrod 6 axially slidably supported therein. This pushrod is slanted or beveled at its both ends 6' and 6", whereby the two bevels lie in planes parallel to each other. The transverse bore 4, at the rear relative to the boring-bar head 1', is internally threaded and serves for receiving a clamping screw 7 which, in the region of the inner inclined or beveled face 6' of pushrod 6, terminates in a cone-shaped tip engaging inclined face 6'.

The boring bar has a measuring device allocated to it. This device includes a sleeve 8 with a cylindrical bore 8', which can be pushed onto the cylindrical boring-bar head 1'. As is visible from FIGS. 5 and 6, the sleeve is provided with a slot 9 for the passage of the tool 3. Numeral 10 designates an eye arranged in sleeve 8, which is penetrated by a threaded bore 10'. The latter has a set screw 11 adjustably supported therein. The axis of this set screw includes with the sleeve axis an acute angle β (FIG. 2) which is open to the front and corresponds to the angle α of FIG. 1.

On the side of the sleeve, opposite the set screw 7, there is arranged, on a radial arm 12, a precision measuring appliance 13 with a measuring feeler 14 radially adjustable relative to the sleeve axis.

For setting the tool 3 to the desired projection, at first, with screw 7 slightly withdrawn, sleeve 8 is pushed onto the cylindrical boring-bar head 1' up to the stop 15, whereby the set screw 11 is aligned coaxially with the tool 3. On turning the set screw 11, its forward end engages the tool 3 and pushes it out of the guide bed 2 towards the measuring feeler 14, whereby the instantaneous radial projection of the tool can be read on the dial 13. When the desired radial projection of the tool is reached, screw 7 is tightened. Thus the conically-shaped tip 7' of the screw bears against the beveled face 6' of pushrod 6, which thus is pushed axially against tool 3, and clamps it friction-tight in its guide bed 2. Now sleeve 8, together with the measuring appliance, can be removed from the boring-bar head, and the boring bar is ready for use.

What I claim is:
1. A boring bar comprising an elongated body having a boring-bar head provided with a transverse bore forming a guide bed, a boring tool adjustably supported in said transverse bore of the boring-bar head, means for clamping the boring tool frictionally in its bed, and a measuring device with a slit sleeve adapted to be pushed onto the boring-bar head for the passage of said tool, said sleeve having an adjustable set screw whose inclination with respect to the sleeve axis corresponds to the inclination of the tool bed to the boring-bar axis, while on the side of said sleeve, opposite the set screw, the measuring device is provided with a measuring feeler radially adjustable with respect to the sleeve axis for setting and measuring the projection of said tool.

2. A boring bar as defined in claim 1 wherein said body is provided with another transverse bore spaced from said bed and with an axial bore connected with the transverse bore receiving the boring tool, and a pushrod axially slidably supported in said axial bore between the two transverse bores.

3. A boring bar as defined in claim 2 wherein the transverse bore receiving said boring tool, includes, with the axis of said body an angle open toward the end of the body provided with said head, the pushrod being provided with beveled inclined faces at both its ends.

4. A boring bar as defined in claim 3 wherein said beveled faces lie in planes parallel to each other.

5. A boring bar as defined in claim 4 wherein said other transverse bore is provided with a clamping screw terminating in a cone-shaped tip for coaction with one of said beveled faces.

6. A boring bar as defined in claim 1 wherein a micrometer with measuring feeler and fitted with an indicating dial serves as said measuring device.

References Cited

UNITED STATES PATENTS

| 1,815,756 | 7/1931 | Aulenback | 77—58 |
| 2,000,476 | 5/1935 | Schmidt | 33—185 |

FOREIGN PATENTS

| 484,126 | 5/1938 | Great Britain. |

GERALD A. DOST, *Primary Examiner.*